United States Patent
Matsumoto et al.

[11] Patent Number: 6,163,588
[45] Date of Patent: Dec. 19, 2000

[54] CORE PLATE AND REACTOR INTERNAL PUMP DIFFERENTIAL PRESSURE LINES FOR A BOILING WATER REACTOR

[75] Inventors: Jack T. Matsumoto, Sunnyvale; Alex B. Fife, San Jose, both of Calif.; Gary J. Ballas, Kirkland, Wash.

[73] Assignee: General Electric Company, Schenectady, N.Y.

[21] Appl. No.: 09/219,968

[22] Filed: Dec. 23, 1998

[51] Int. Cl.[7] .......................... G21C 17/02; G21C 17/032
[52] U.S. Cl. ........................... 376/247; 376/246; 376/287
[58] Field of Search ................................... 376/247, 287, 376/246, 245

[56] References Cited

U.S. PATENT DOCUMENTS 5,615,239  3/1997  Deaver et al. ............................ 376/247

*Primary Examiner*—Charles T. Jordan
*Assistant Examiner*—K. Kevin Mun
*Attorney, Agent, or Firm*—Armstrong Teasdale LLP

[57] ABSTRACT

A modular differential pressure measuring system for a boiling water nuclear reactor pressure vessel is described. The modular pressure differential system includes a plurality of pressure lines having a plurality of pressure line sections. The system also includes a shroud having at least one replaceable shroud section. Each shroud section includes at least one pressure line section which is configured to connect to and disconnect from corresponding pressure line sections in adjacent shroud sections without welding. Additionally, the system includes a reactor bottom head petal section having a shroud support flange and a plurality of bores defining pressure line sections wherein at least one pressure line section of said bottom head petal is configured to couple with a corresponding pressure line section of an adjacent shroud section. The modular pressure system does not require cutting of the pressure lines or pressure line supports for replacement of the replaceable shroud sections. Additionally, the modular differential pressure system does not require welding of pressure lines and/or pressure line supports during installation of a replaceable shroud section.

21 Claims, 5 Drawing Sheets

CORE PLATE AND REACTOR INTERNAL PUMP DIFFERENTIAL PRESSURE LINES FOR A BOILING WATER REACTOR

BACKGROUND OF THE INVENTION

This invention relates generally to nuclear reactors and more particularly, to core plate and reactor internal pump differential pressure lines for a boiling water reactor.

A reactor pressure vessel (RPV) of a boiling water reactor (BWR) typically has a generally cylindrical shape and is closed at both ends, e.g., by a bottom head and a removable top head. A top guide typically is spaced above a core plate within the RPV. A core shroud, or shroud, typically surrounds the core plate and is supported by a shroud support structure. Particularly, the shroud has a generally cylindrical shape and surrounds both the core plate and the top guide. The core center axis is substantially coaxial with the center axis of the shroud, and the shroud is open at both ends so that water can flow up through the lower end of the shroud and out through the upper end of the shroud. The shroud, top guide, and core plate limit lateral movement of the core fuel bundles.

The shroud, due to its large size, is formed by coupling a plurality of stainless steel cylindrical sections together, typically by welding. Shroud welds, however, increase the susceptibility of the shroud material to a detrimental effect known as inter-granular stress corrosion cracking (IGSCC). Typically, cracking may occur in the heat affected zone of the shroud welds. Currently, volumetric inspections are performed to detect and evaluate the extent of cracking. If the cracking is determined to be significant, repairs may be performed to re-establish the integrity of the weld joint, or the shroud is replaced.

The RPV also includes reactor internal pumps located in the annulus between the shroud and the pressure vessel wall. The internal pumps provide circulation of water in the RPV. Typically differential pressure lines are used to measure the reactor internal pump flow and the flow of water through the reactor core located inside the shroud. The pressure lines are usually constructed using pipe and pipe fittings. The pressure lines enter the RPV through penetrations in the bottom head. The pressure lines extend along the inside of the shroud and are supported by brackets welded to the shroud. The brackets are required to prevent flow induced vibrations in the pressure lines. One reactor internal pump differential pressure line penetrates the shroud above pump impellers and the other terminates below the impellers inside of the shroud. The core differential pressure lines terminate above and below the core plate.

Because the differential lines are welded to the shroud, replacement of shroud sections is difficult and time consuming. The pressure lines must first be removed from the shroud section before replacement of the shroud section. Also the differential pressure lines must be reinstalled, i.e., welded to the new shroud section.

It would be desirable to provide a shroud that includes easily replaceable shroud sections. Particularly, it would be desirable to provide a shroud that includes replaceable shroud sections that can be removed without cutting pressure lines or pressure line supports, and that does not require welding pressure lines and/or pressure line supports to install a shroud section.

BRIEF SUMMARY OF THE INVENTION

These and other objects may be attained by a modular differential pressure measuring system for a boiling water nuclear reactor pressure vessel. The differential pressure measuring system permits the use of replaceable shroud sections because the modular pressure system does not require cutting the pressure lines or pressure line supports for replacement of the replaceable shroud sections. Additionally, the modular differential pressure system does not require welding of pressure lines and/or pressure line supports during installation of a replaceable shroud section.

The modular differential pressure system includes a plurality of pressure lines with each pressure line including a plurality of pressure line sections. The modular system also includes a shroud having at least one replaceable shroud section. Each shroud section includes at least one pressure line section configured to connect to and disconnect from corresponding pressure line sections in adjacent shroud sections without welding. A shroud section may include at least one pressure line coupled to support brackets welded to the shroud section. The pressure line remains coupled to the shroud section and is removed or installed with the shroud section as a modular component. Connections of the pressure lines of one shroud section to an adjacent section are located at the flanged interface between shroud sections. Therefore, a separate flanged joint for the pressure line sections are not required, and welding of the connection is also not required.

The modular system also includes a reactor bottom head petal section. The bottom head petal section is configured to support the shroud sections and includes a shroud support flange. The bottom head petal section also includes a plurality of bores defining pressure line sections. At least one pressure line section of the bottom head petal is configured to couple with a corresponding pressure line section of an adjacent shroud section. Particularly, a short vertical bore extends from the end of the horizontal bore to an outside surface of the shroud support flange. This vertical bore is configured to couple to a vertical bore in the lower shroud section, sometimes referred to as the shroud support. The vertical bore may extend vertically through several shroud sections, or the lower shroud vertical bore may include a short horizontal bore extending from the end of the bore to an outside surface of the lower shroud section. This horizontal bore may in turn be coupled to a vertical or horizontal pipe section of the pressure line extending along the inside surface of the shroud.

In operation, the modular differential pressure system measures the pressure at two separate points within the reactor pressure vessel. The pressure differential is an indication of the flow between the two points within the reactor. Typically, the core flow is measured by measuring the pressure above and below the reactor core plate. Also the flow in the annulus of the reactor may be measured by measuring the pressure above and below the reactor internal pump impellers.

Because the pressure system is modular, when a shroud section is removed for replacement, the modular pressure lines are removed with the shroud section. No cutting is required to disconnect a pressure line section from the corresponding pressure line section of an adjacent shroud section. The removed shroud section is then replaced with a shroud section that also includes integral pressure lines which re-couple to the pressure lines of an adjacent shroud section without welding.

The above described modular differential pressure system permits the replacement of shroud sections without having to cut the differential pressure lines from the shroud. The modular differential pressure system also permits the installation of a replacement shroud section without having to reinstall the pressure lines by welding the lines to the core shroud. The modular system also simplifies and speeds up the process of replacing the core shroud in a nuclear reactor.

DETAILED DESCRIPTION OF THE INVENTION

Figure 1:
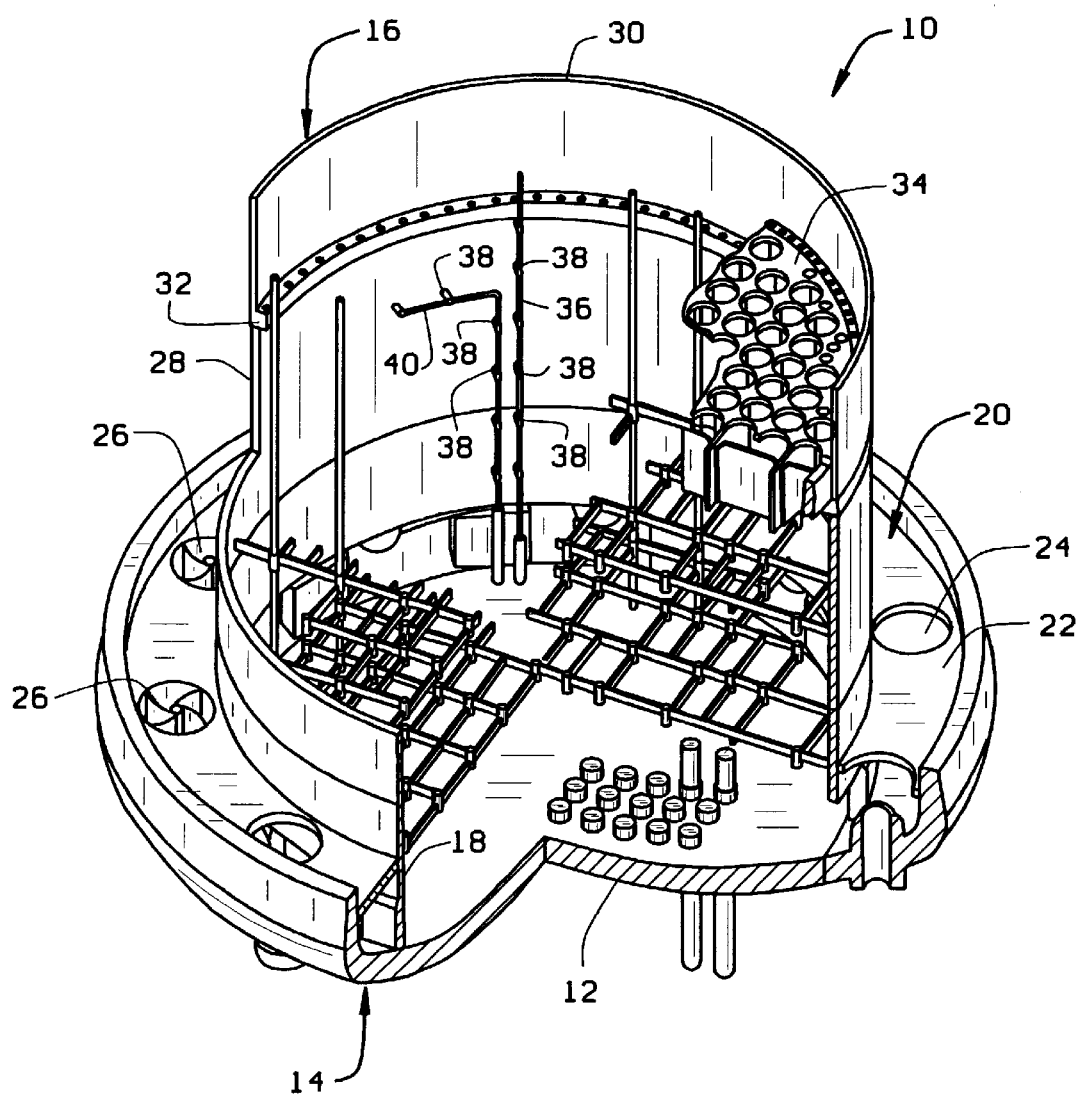
FIG. 1 is a sectional view, with parts cut away, of a boiling water nuclear reactor pressure vessel.

FIG. 1 is a sectional view, with parts cut away, of a nuclear reactor pressure vessel (RPV) 10. RPV 10 has a generally cylindrical shape and is closed at one end by a bottom head 12 and at its other end by a removable top head (not shown). A bottom head petal 14 extends from the bottom head and supports the side wall (not shown) of RPV 10. A cylindrically shaped core shroud 16 surrounds the reactor core (not shown) and is supported by a shroud support 18. An annulus 20 is formed between shroud 16 and the sidewall of RPV 10. A baffle plate 22, which has a ring shape, extends between shroud 16 and bottom head petal 14. Baffle plate 22 includes a plurality of circular openings 24 that house reactor internal pump impellers 26. Reactor internal pump impellers 26 cause the water in RPV 10 to flow through annulus 20.

Shroud 16 is formed by a lower shroud section 28 and an upper shroud section 30. A circular core plate ledge 32 is located between upper and lower shroud sections 28 and 30. RPV 10 also includes a core plate 34 coupled to core plate ledge 32.

To measure the flow of water through the core, pressure measurements are made above and below core plate 34. The differential pressure can then be translated into a core flow. RPV 10 includes core flow differential pressure lines 36 (one shown). Differential pressure lines 36 enter RPV 10 through bottom head 12 and extend vertically along the inside of shroud 16. Differential pressure lines 36 are coupled to shroud 16 by a plurality of support brackets 38. Particularly, brackets 38 are welded to shroud 16 and differential pressure lines 36 are welded to support brackets 38. Additionally, reactor internal pump flow may be measured by measuring the differential pressure at a location above and below reactor internal pump impellers 26. RPV 10 also includes reactor internal pump flow differential pressure lines 40 (one shown). Differential pressure lines 40 enter RPV 10 through bottom head 12 and extend vertically along the inside of shroud 16. Differential pressure lines 40 also extend horizontally along the inside of shroud 16 to a point above or below reactor internal pump impeller 26. Like differential pressure lines 36, differential lines 40 are coupled to shroud 16 by support brackets 38. Differential pressure lines 36 and 40 are typically of welded construction using pipe and pipe fittings.

FIGS. 2, 3, 4, and 5 are partial sectional views of an RPV 50 having a reactor core shroud 52 in accordance with an embodiment of the present invention. RPV 50 includes a bottom head petal 54 having a shroud support flange 56. RPV sidewall 58 extends from bottom head petal 54. Shroud 52 is supported by shroud support flange 56 of bottom head petal 54.

Shroud 52 includes a first shroud section 60, typically referred to as the flange, a second shroud section 62, typically referred to as the lower shroud, and a third shroud section 64, typically referred to as the upper shroud. A core plate ledge 66 is located between second and third shroud sections 62 and 64. A core plate 68 is coupled to core plate ledge 66.

Figure 3:
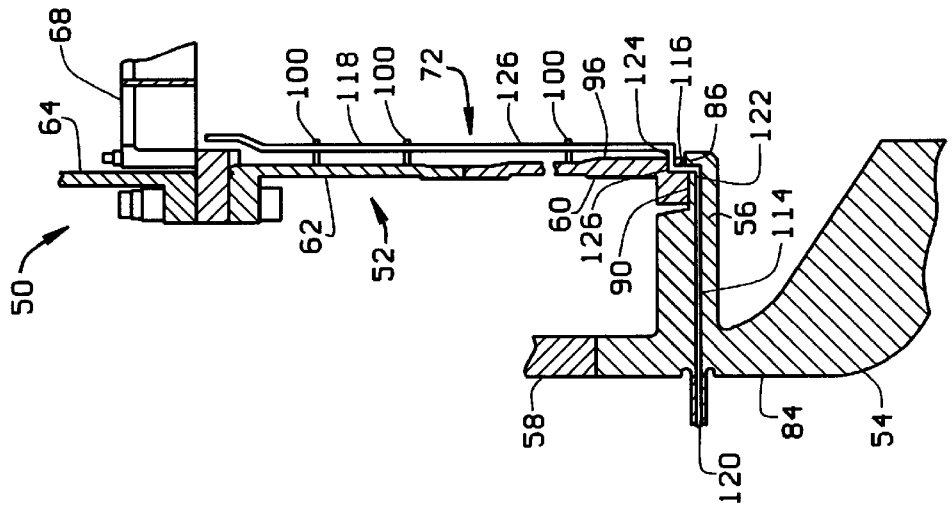
FIG. 3 is a partial sectional view of an RPV having a reactor core shroud in accordance with an embodiment of the present invention.
Figure 2:
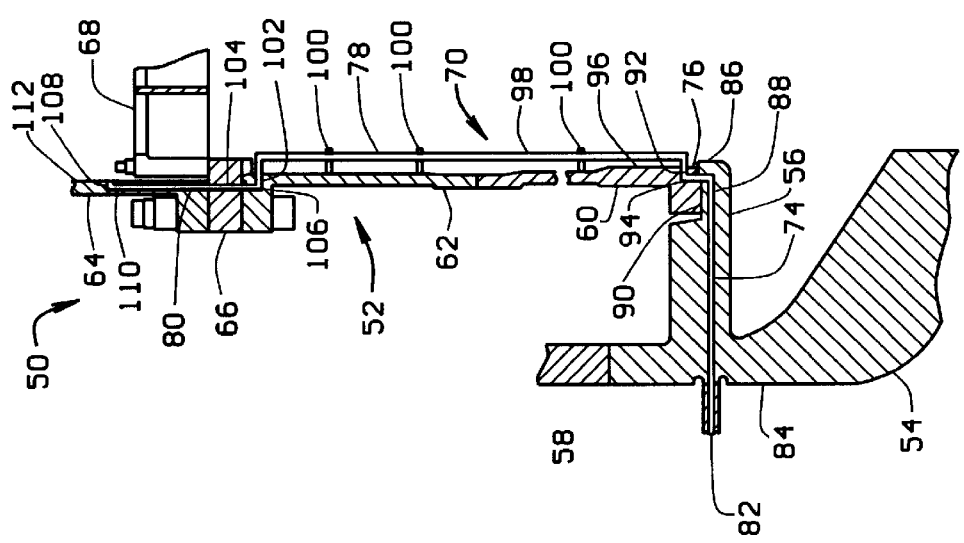
FIG. 2 is a partial sectional view of an RPV having a reactor core shroud in accordance with an embodiment of the present invention.

To measure the core flow, RPV 50 includes modular differential pressure lines 70 (FIG. 2) and 72 (FIG. 3). Referring to FIG. 2, differential pressure line 70 includes first, second, third, and fourth pressure line sections 74, 76, 78, and 80. First pressure line section 74 is defined by a bore 82 extending from an outer surface 84 of bottom head petal 54 to an outer surface 86 of shroud support flange 56. Second pressure line section 76 is defined by a first bore 88 extending from a flange mating surface 90 of first shroud section 60 and a second bore 92 extending substantially perpendicularly from an end 94 of first bore 88 to an inside surface 96 of shroud 52. Second pressure line section 76 is configured to couple to first pressure line section 74. Third pressure line section 78 is defined by a pipe 98 extending toward core plate 68 along inner surface 96 of shroud 52. Pipe 98 is coupled to shroud 52 by support brackets 100. Third pressure line section 78 is configured to couple to second pressure line section 76 and fourth pressure line section 80. Fourth pressure line section 80 is defined by a first bore 102 extending into second shroud section 62, a second bore 104 extending substantially perpendicularly from an end 106 of first bore 102 through second shroud section 62, through core plate ledge 66, and into third shroud section 64, and a third bore 108 extending substantially perpendicularly from an end 110 of second bore 104 to an inside surface 112 of third shroud section 64.

Referring to FIG. 3, differential pressure line 72 includes first, second, and third pressure line sections 114, 116, and 118. First pressure line section 114 is defined by a bore 120 extending from outer surface 84 of bottom head petal 54 to outer surface 86 of shroud support flange 56. Second pressure line section 116 is defined by a first bore 122 extending from flange mating surface 90 of first shroud section 60 and a second bore 124 extending substantially perpendicularly from an end 126 of first bore 122 to inside surface 96 of shroud 52. Second pressure line section 116 is configured to couple to first pressure line section 114. Third pressure line section 118 is defined by a pipe 126 extending toward core plate 68 along inner surface 96 of shroud 52 and terminating below core plate 68. Pipe 126 is coupled to shroud 52 by support brackets 100.

Figure 5:
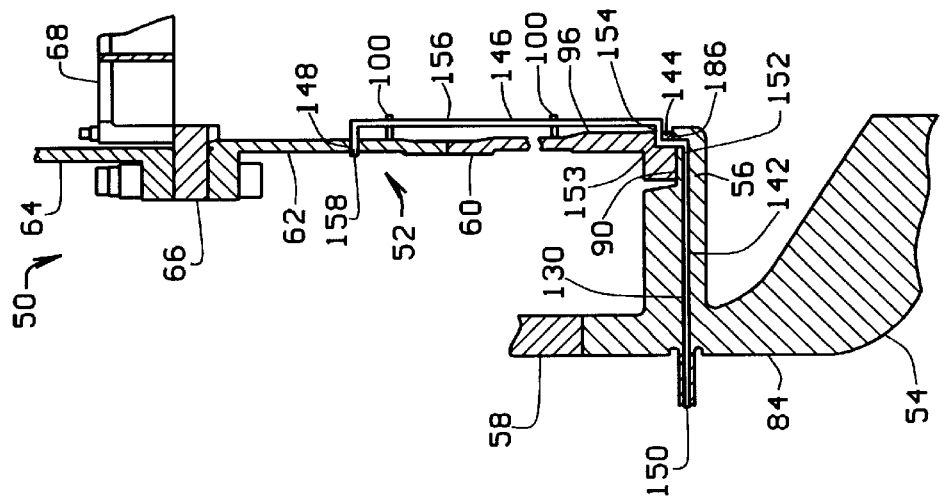
FIG. 5 is a partial sectional view of an RPV having a reactor core shroud in accordance with an embodiment of the present invention.
Figure 4:
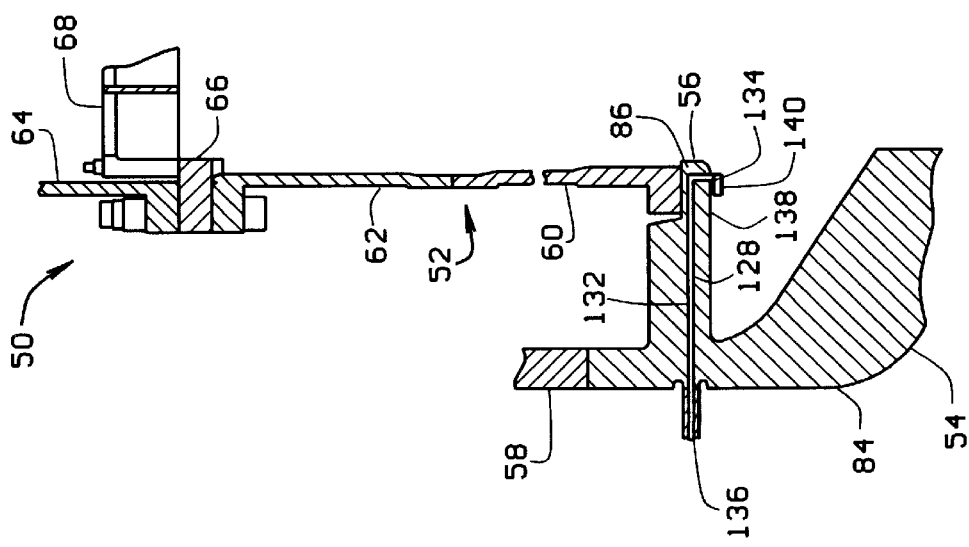
FIG. 4 is a partial sectional view of an RPV having a reactor core shroud in accordance with an embodiment of the present invention.

To measure the reactor internal pump flow, RPV 50 includes modular differential pressure lines 128 (FIG. 4) and 130 (FIG. 5). Referring to FIG. 4, differential pressure line 128 includes first and second pressure line sections 132 and 134. First pressure line section 132 is defined by a bore 136 extending from outer surface 84 of bottom head petal 54 to an inner surface 138 of bottom head petal 54. Second pressure line section 134 is defined by a pipe 140 coupled to bore 136 and terminating adjacent shroud support flange 56 opposite: to surface 86.

Referring to FIG. 5, differential pressure line 130 includes first, second, third, and fourth pressure line sections 142, 144, 146, and 148. First pressure line section 142 is defined by a bore 150 extending from outer surface 84 of bottom head petal 54 to outer surface 186 of shroud support flange 56. Second pressure line section 144 is defined by a first bore 152 extending from a flange mating surface 90 of first shroud section 60 and a second bore 154 extending substantially perpendicularly from an end 153 of first bore 152 to inside surface 96 of shroud 52. Second pressure line section 144 is configured to couple to first pressure line section 142. Third pressure line section 146 is defined by a pipe 156 extending toward core plate 68 along inner surface 96 of shroud 52. Pipe 156 is coupled to shroud 52 by support brackets 100. Third pressure line section is configured to couple to second pressure line section 144 and fourth pressure line section 148. Fourth pressure line section 148 is defined by a bore 158 extending through second shroud section 62.

In operation, modular differential pressure lines 70, 72, 128, and 130 measure the pressure at separate points within the reactor pressure vessel. The pressure differential is an indication of the flow between two points within the reactor. Typically, the core flow is measured by measuring the pressure above and below reactor core plate 68 by differential pressure lines 70 and 72. The flow in the annulus of the reactor may be measured by measuring the pressure above and below the reactor internal pump impellers by differential pressure lines 128 and 130.

Because pressure lines 70, 72, 128, and 130 are modular, when a shroud section such as shroud section 60, 62, or 64 is removed for replacement, the modular pressure line sections or portions of those sections that are integral to the shroud section are removed with the shroud section. For example, if shroud section 64 was removed from reactor 50, the portions of integral pressure line section 80 that are associated with shroud section 64 would also be removed, i.e., second bore 104 and third bore 108. No cutting is required to disconnect a pressure line section from the corresponding pressure line section of an adjacent shroud section. The removed shroud section is then replaced with a shroud section that also includes integral pressure lines which re-couple to the pressure lines of an adjacent shroud section without welding.

The above described modular differential pressure lines 70, 72, 128, and 130 permit the replacement of shroud sections 60, 62, and 64 without having to cut the differential pressure lines from the shroud. The modular differential pressure lines also permit the installation of a replacement shroud section without having to reinstall the pressure lines by welding the lines to core shroud 52. The modular differential pressure lines also simplify and speed up the process of replacing core shroud 52 in reactor pressure vessel 50.

FIGS. 6, 7, 8, and 9 are sectional views of an RPV 200 having a reactor core shroud 202 in accordance with another embodiment of the present invention. RPV 200 includes a bottom head petal 204 having a shroud support flange 206. RPV sidewall 208 extends from bottom head petal 204. Shroud 202 is supported by shroud support flange 206 of bottom head petal 204.

Shroud 202 includes a first shroud section 210, typically referred to as the shroud support, a second shroud section 212, typically referred to as the lower shroud, and a third shroud section 214, typically referred to as the upper shroud. A core plate ledge 216 is locate between second and third shroud sections 212 and 214. A core plate 218 is coupled to core plate ledge 216.

Figure 7:
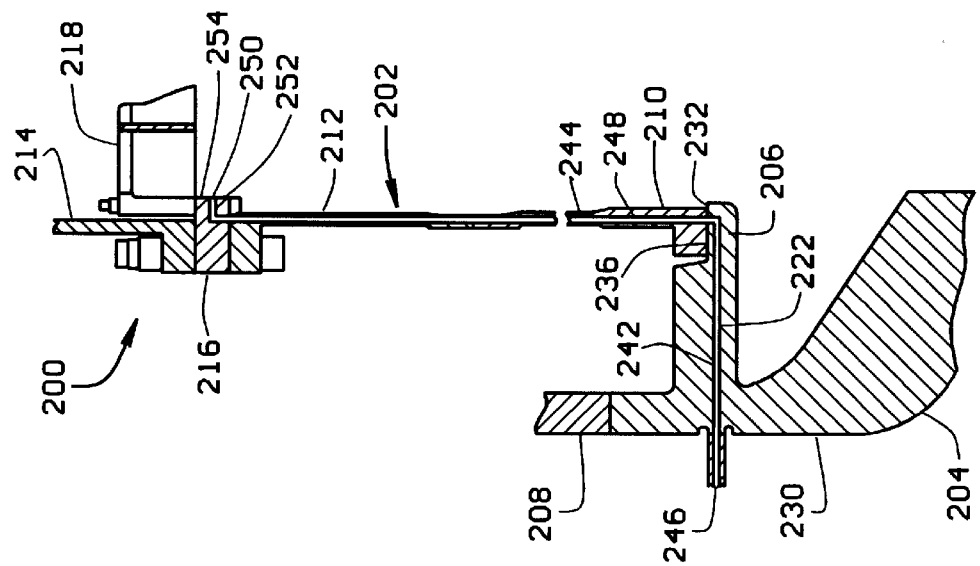
FIG. 7 is a partial sectional view of an RPV having a reactor core shroud in accordance with another embodiment of the present invention.
Figure 6:
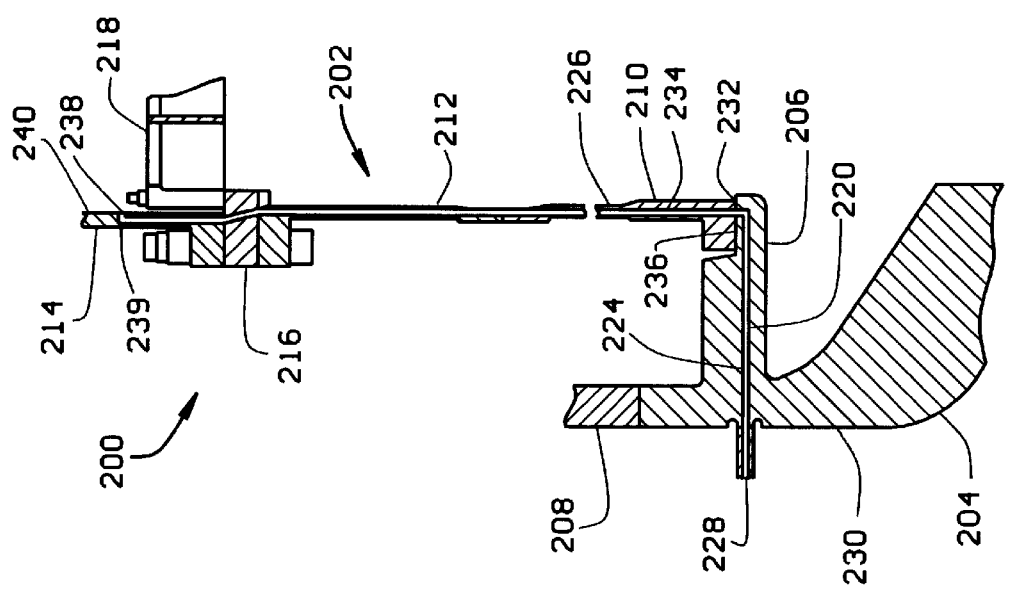
FIG. 6 is a partial sectional view of an RPV having a reactor core shroud in accordance with another embodiment of the present invention.

To measure the core flow, RPV 200 includes modular differential pressure lines 220 (FIG. 6) and 222 (FIG. 7). Referring to FIG. 6, differential pressure line 220 includes first and second pressure line sections 224 and 226. First pressure line section 224 is defined by a bore 228 extending from an outer surface 230 of bottom head petal 204 to an outer surface 232 of shroud support flange 206. Second pressure line section 226 is defined by a first bore 234 extending from a flange mating surface 236 of first shroud section 210 through first shroud section 210, through second shroud section 212, through core plate ledge 216, and into third shroud section 214, and a second bore 238 extending substantially perpendicularly from an end 239 of first bore 234 to an inside surface 240 of shroud 202. Second pressure line section 226 is configured to couple to first pressure line section 224.

Referring to FIG. 7, differential pressure line 222 includes first and second pressure line sections 242 and 244. First pressure line section 242 is defined by a bore 246 extending from outer surface 230 of bottom head petal 204 to an outer surface 232 of shroud support flange 206. Second pressure line section 244 is defined by a first bore 248 extending from a flange mating surface 236 of first shroud section 210 through first shroud section 210, through second shroud section 212, and into core plate ledge 216, and a second bore 250 extending substantially perpendicularly from an end 252 of first bore 248 to an inside surface 254 of core plate ledge 216. Second pressure line section 244 is configured to couple to first pressure line section 242.

Figure 9:
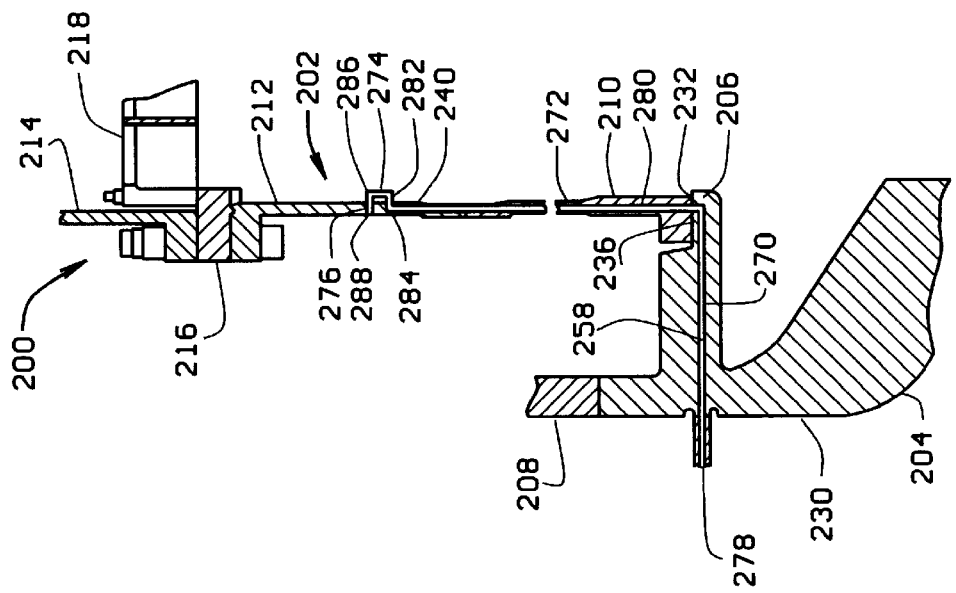
FIG. 9 is a partial sectional view of an RPV having a reactor core shroud in accordance with another embodiment of the present invention.
Figure 8:
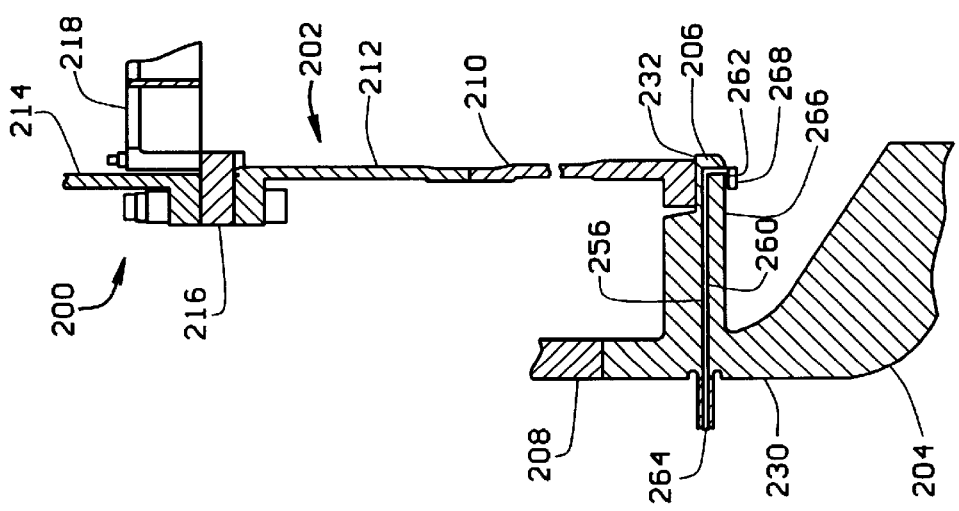
FIG. 8 is a partial sectional view of an RPV having a reactor core shroud in accordance with another embodiment of the present invention.

To measure the reactor internal pump flow, RPV 200 includes modular differential pressure lines 256 (FIG. 8) and 258 (FIG. 9). Referring to FIG. 8, differential pressure line 256 includes first and second pressure line sections 260 and 262. First pressure line section 260 is defined by a bore 264 extending from outer surface 230 of bottom head petal 204 to an inner surface 266 of bottom head petal 204. Second pressure line section 262 is defined by a pipe 268 coupled to bore 264 and terminating adjacent shroud support flange 206 and opposite to surface 232.

Referring to FIG. 9, differential pressure line 258 includes first, second, third, and fourth pressure line sections 270, 272, 274 and 276. First pressure line section 270 is defined by a bore 278 extending from outer surface 230 of bottom head petal 204 to outer surface 232 of shroud support flange 206. Second pressure line section 272 is defined by a first bore 280 extending from flange mating surface 236 of first shroud section 210, through first shroud section 210 and into second shroud section 212, and a second bore 282 extending substantially perpendicularly from an end 284 of first bore 280 to inside surface 240 of shroud 202. Second pressure line section 272 is configured to couple to first pressure line section 270. Third pressure line section 274 is defined by a pipe 286 extending toward core plate 218 along inner surface 236 of shroud 202. Third pressure line section 274 is configured to couple to second pressure line section 272 and fourth pressure line section 276. Fourth pressure line section 276 is defined by a bore 288 extending through second shroud section 212.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. A modular differential pressure measuring system for a nuclear reactor pressure vessel, the pressure vessel including a core plate and a reactor internal pump having at least one impeller, said modular system comprising:

a plurality of pressure lines, each said pressure line comprising a plurality of pressure line sections;

a shroud comprising at least one shroud section, each said shroud section comprising at least one pressure line section, said pressure line section configured to connect to and disconnect from corresponding pressure line sections in adjacent shroud sections without welding; and a reactor bottom head petal section comprising a shroud support flange and a plurality of bores defining pressure line sections wherein at least one pressure line section of said bottom head petal is configured to couple with a corresponding pressure line section of an adjacent shroud section, each said pressure line section comprising a bore extending from an outer surface of said bottom head petal and at least partially through said bottom head petal shroud support flange.

2. A differential pressure measuring system in accordance with claim 1 wherein said shroud pressure line sections are welded to said shroud sections.

3. A differential pressure measuring system in accordance with claim 1 wherein said shroud pressure line sections comprise a vertical portion, said vertical pressure line portion defined by a vertical bore through said shroud section.

4. A differential pressure measuring system in accordance with claim 3 wherein said shroud pressure line sections further comprise a horizontal portion, said horizontal pressure line portion defined by a pipe welded to said shroud section and configured to be in flow communications with said vertical pressure line portion.

5. A differential pressure measuring system in accordance with claim 1 wherein said shroud further comprises a core plate ledge coupled to and located between adjacent shroud sections, and said differential pressure measuring system comprises a first and a second pressure line;

said first pressure line comprising a first pressure line section comprising a bore extending from an outer surface of said bottom head petal to an outer surface of said bottom head petal shroud support flange, a second pressure line section configured to couple to said first section, said second section comprising a bore extending through a first shroud section, adjacent said shroud support flange, to an inside surface of said shroud, and a third pressure line section configured to couple to said second section, said third pressure line section comprising a pipe extending along an inner surface of said shroud and terminating below the core plate; and said second pressure line comprising a first pressure line section comprising a bore extending from an outer surface of said bottom head petal to an outer surface of said bottom head petal shroud support flange, a second pressure line section configured to couple to said first section, said second section comprising a bore extending through said first shroud section, adjacent said shroud support flange, to an inside surface of said shroud, a third pressure line section configured to couple to said second section, said third section comprising a pipe extending along an inner surface of said shroud, a fourth pressure line section configured to couple to said third section, said fourth section comprising a bore extending into said shroud section adjacent said core plate ledge, and through said shroud section, through said core plate ledge, and through a second shroud section to an inside surface of said second shroud section.

6. A differential pressure measuring system in accordance with claim 5 wherein said system further comprises a third and a fourth pressure line;

said third pressure line comprising a first pressure line section comprising a bore extending from said outer surface of said bottom head petal to an inner surface of said bottom head petal, a second pressure line section coupled to said first section said second section comprising a pipe terminating under said shroud support flange of said bottom head petal;

said fourth pressure line comprising a first pressure line section comprising a bore extending from an outer surface of said bottom head petal to an outer surface of said bottom head petal shroud support flange, a second pressure line section configured to couple to said first section, said second section comprising a bore extending through said first shroud section adjacent said shroud support to said inside surface of said shroud, a third pressure line section configured to couple to said second section, said third section comprising a pipe extending along said inner surface of said shroud, a fourth pressure line section configured to couple to said third section, said fourth section comprising a bore extending through said shroud.

7. A differential pressure measuring system in accordance with claim 1 wherein said system comprises a first and a second pressure line;

said first pressure line comprising a first pressure line section comprising a bore extending from an outer surface of said bottom head petal to an outer surface of said bottom head petal shroud support flange, a second pressure line section configured to couple to said first section, said second section comprising a bore extending through said shroud and into said core plate ledge to an inside surface of said core plate ledge; and said second pressure line comprising a first pressure line section comprising a bore extending from an outer surface of said bottom head petal to an outer surface of said bottom head petal shroud support flange, a second pressure line section configured to couple to said first section, said second section comprising a bore extending through said first shroud section, into and through said core plate ledge, and into said second shroud section and to said inside surface of said second shroud section.

8. A differential pressure measuring system in accordance with claim 7 wherein said system further comprises a third and a fourth pressure line;

said third pressure line comprising a first pressure line section comprising a bore extending from said outer surface of said bottom head petal to said inner surface of said bottom head petal, a second pressure line section coupled to said first section said second section comprising a pipe terminating under said shroud support flange of said bottom head petal;

said fourth pressure line comprising a first pressure line section comprising a bore extending from said outer surface of said bottom head petal to said outer surface of said bottom head petal shroud support flange, a second pressure line section configured to couple to said first section, said second section comprising a bore extending through said first shroud section to said inside surface of said shroud, a third pressure line section configured to couple to said second section, said third section comprising a pipe extending along said inner surface of said shroud, a fourth pressure line section configured to couple to said third section, said fourth section comprising a pipe extending substantially perpendicularly to said third pressure line section along an inner surface of said shroud, and a fifth pressure line section configured to couple to said fourth section, said fifth section comprising bore extending through said shroud.

9. A modular shroud system for a nuclear reactor pressure vessel, the pressure vessel including a core plate and a reactor internal pump having at least one impeller, said modular system comprising:

a plurality of pressure lines, each said pressure line comprising a plurality of pressure line sections;

a shroud comprising at least one modular shroud section, each said shroud section comprising at least one pressure line section, said pressure line section configured to connect to and disconnect from corresponding pressure line sections in adjacent shroud sections without welding; and a reactor bottom head petal section comprising a shroud support flange and a plurality of bores defining pressure line sections wherein at least one pressure line section of said bottom head petal is configured to couple with a corresponding pressure line section of an adjacent shroud section, each said pressure line section comprising a bore extending from an outer surface of said bottom head petal and at least partially through said bottom head petal shroud support flange.

10. A modular shroud system in accordance with claim 9 wherein said shroud pressure line sections are welded to said shroud sections.

11. A modular shroud system in accordance with claim 9 wherein said shroud pressure line sections comprise a vertical portion, said vertical pressure line portion defined by a vertical bore through said shroud section.

12. A modular shroud system in accordance with claim 11 wherein said shroud pressure line sections further comprise a horizontal portion, said horizontal pressure line portion defined by a pipe welded to said shroud section and configured to be in flow communications with said vertical pressure line portion.

13. A modular shroud system in accordance with claim 9 wherein said shroud further comprises a core plate ledge coupled to and located between adjacent shroud sections, and said differential pressure measuring system comprises a first and a second pressure line;

said first pressure line comprising a first pressure line section comprising a bore extending from an outer surface of said bottom head petal to an outer surface of said bottom head petal shroud support flange, a second pressure line section configured to couple to said first section, said second section comprising a bore extending through a first shroud section, adjacent said shroud support flange, to an inside surface of said shroud, and a third pressure line section configured to couple to said second section, said third pressure line section comprising a pipe extending along an inner surface of said shroud and terminating below the core plate; and said second pressure line comprising a first pressure line section comprising a bore extending from an outer surface of said bottom head petal to an outer surface of said bottom head petal shroud support flange, a second pressure line section configured to couple to said first section, said second section comprising a bore extending through said first shroud section, adjacent said shroud support flange, to an inside surface of said shroud, a third pressure line section configured to couple to said second section, said third section comprising a pipe extending along an inner surface of said shroud, a fourth pressure line section configured to couple to said third section, said fourth section comprising a bore extending horizontally into said shroud section adjacent said bottom head petal, and through said shroud section, through said core plate ledge, and through a second shroud section to an inside surface of said second shroud section.

14. A modular shroud system in accordance with claim 13 wherein said system further comprises a third and a fourth pressure line;

said third pressure line comprising a first pressure line section comprising a bore extending from said outer surface of said bottom head petal to an inner surface of said bottom head petal, a second pressure line section coupled to said first section said second section comprising a pipe terminating under said shroud support flange of said bottom head petal;

said fourth pressure line a first pressure line section comprising a bore extending from an outer surface of said bottom head petal to an outer surface of said bottom head petal shroud support flange, a second pressure line section configured to couple to said first section, said second section comprising a bore extending through said first shroud section adjacent said shroud support to said inside surface of said shroud, a third pressure line section configured to couple to said second section, said third section comprising a pipe extending along said inner surface of said shroud, a fourth pressure line section configured to couple to said third section, said fourth section comprising a bore extending through said shroud.

15. A modular shroud system in accordance with claim 9 wherein said system comprises a first and a second pressure line;

said first pressure line comprising a first pressure line section comprising a bore extending from an outer surface of said bottom head petal to an outer surface of said bottom head petal shroud support flange, a second pressure line section configured to couple to said first section, said second section comprising a bore extending through said shroud and into said core plate ledge to an inside surface of said core plate ledge; and said second pressure line comprising a first pressure line section comprising a bore extending from an outer surface of said bottom head petal to an outer surface of said bottom head petal shroud support flange, a second pressure line section configured to couple to said first section, said second section comprising a bore extending through said first shroud section, into and through said core plate ledge, and into said second shroud section and to said inside surface of said upper shroud section.

16. A modular shroud system in accordance with claim 15 wherein said system further comprises a third and a fourth pressure line;

said third pressure line comprising a first pressure line section comprising a bore extending from said outer surface of said bottom head petal to said inner surface of said bottom head petal, a second pressure line section coupled to said first section said second section comprising a pipe terminating under said shroud support flange of said bottom head petal;

said fourth pressure line a first pressure line section comprising a bore extending from said outer surface of said bottom head petal to said outer surface of said bottom head petal shroud support flange, a second pressure line section configured to couple to said first section, said second section comprising a bore extending through said first shroud section to said inside surface of said shroud, a third pressure line section configured to couple to said second section, said third section comprising a pipe extending along said inner surface of said shroud, a fourth pressure line section configured to couple to said third section, said fourth section comprising a pipe extending substantially perpendicularly to said third pressure line section along an inner surface of said shroud, and a fifth pressure line section configured to couple to said fourth section, said fifth section comprising bore extending through said shroud.

17. A modular shroud system for a nuclear reactor pressure vessel, the pressure vessel including a core plate and a reactor internal pump having at least one impeller, said modular system comprising a shroud comprising at least one modular shroud section, each said shroud section comprising at least one pressure line section, said pressure line section configured to connect to and disconnect from corresponding pressure line sections in adjacent shroud sections without welding, said modular system further comprising a reactor bottom head petal section comprising a shroud support flange and a plurality of bores defining pressure line sections, each said pressure line section comprising a bore extending from an outer surface of said bottom head petal and at least partially through said bottom head petal shroud support flange.

18. A modular shroud system in accordance with claim 17 further comprising a reactor bottom head petal section comprising a shroud support flange and a plurality of bores defining pressure line sections wherein at least one pressure line section of said bottom head petal is configured to couple with a corresponding pressure line section of an adjacent shroud section.

19. A modular shroud system in accordance with claim 17 wherein said shroud pressure line sections are welded to said shroud sections.

20. A modular shroud system in accordance with claim 17 wherein said shroud pressure line sections comprise a vertical portion, said vertical pressure line portion defined by a vertical bore through said shroud section.

21. A modular shroud system in accordance with claim 20 wherein said shroud pressure line sections further comprise a horizontal portion, said horizontal pressure line portion defined by a pipe welded to said shroud section and configured to be in flow communications with said vertical pressure line portion.

* * * * *

UNITED STATES PATENT AND TRADEMARK OFFICE
CERTIFICATE OF CORRECTION

| | |
|---|---|
| PATENT NO. | : 6,163,588 |
| DATED | : December 19, 2000 |
| INVENTOR(S) | : Jack T. Matsumoto, Alex B. Fife, and Gary J. Ballas |

It is certified that error appears in the above-identified patent and that said Letters Patent is hereby corrected as shown below:

<u>Claim 18, column 12,</u>
Line 15, delete "further comprising a reactor bottom head petal section comprising a shroud support flange and a plurality of bores defining pressure line sections".

Signed and Sealed this

Second Day of October, 2001

Attest:

*Nicholas P. Godici*

NICHOLAS P. GODICI
*Acting Director of the United States Patent and Trademark Office*

*Attesting Officer*